(12) United States Patent
Tian et al.

(10) Patent No.: US 10,882,614 B2
(45) Date of Patent: Jan. 5, 2021

(54) TRANSPORT DRONE

(71) Applicant: Haoxiang Electric Energy (Kunshan) Co., Ltd., Jiangsu (CN)

(72) Inventors: Yu Tian, Jiangsu (CN); Wenyan Jiang, Jiangsu (CN)

(73) Assignee: Haoxiang Electric Energy (kunshan) Co., Ltd., Jiangsu (CN)

( * ) Notice: Subject to any disclaimer, the term of this patent is extended or adjusted under 35 U.S.C. 154(b) by 298 days.

(21) Appl. No.: 16/024,832

(22) Filed: Jun. 30, 2018

(65) Prior Publication Data

US 2018/0305018 A1 Oct. 25, 2018

(30) Foreign Application Priority Data

Jun. 30, 2017 (CN) .................... 2017 2 0782341 U

(51) Int. Cl.
| | |
|---|---|
| *B64D 9/00* | (2006.01) |
| *B64C 39/02* | (2006.01) |
| *G05D 3/12* | (2006.01) |
| *G05D 1/00* | (2006.01) |
| *A47G 23/06* | (2006.01) |

(52) U.S. Cl.
CPC .............. *B64C 39/024* (2013.01); *B64D 9/00* (2013.01); *G05D 1/0094* (2013.01); *G05D 3/12* (2013.01); *A47G 23/06* (2013.01); *B64C 2201/024* (2013.01); *B64C 2201/027* (2013.01); *B64C 2201/128* (2013.01)

(58) Field of Classification Search
CPC ............ B64C 39/024; B64C 2201/027; B64C 2201/128; G05D 1/0094; G05D 3/12
See application file for complete search history.

(56) References Cited

U.S. PATENT DOCUMENTS

| | | | |
|---|---|---|---|
| 9,688,404 B1* | 6/2017 | Buchmueller | G05D 1/0094 |
| 9,891,631 B1* | 2/2018 | Hanlon | G05D 1/0816 |
| 2014/0037278 A1* | 2/2014 | Wang | H04N 5/2328 396/55 |
| 2016/0291445 A1* | 10/2016 | Fisher, Sr. | G03B 15/006 |
| 2016/0340006 A1* | 11/2016 | Tang | B64C 39/024 |
| 2018/0156770 A1* | 6/2018 | Saez | A01B 79/005 |
| 2018/0257775 A1* | 9/2018 | Baek | B64C 39/024 |
| 2019/0072954 A1* | 3/2019 | Taveira | G05D 1/101 |
| 2019/0161190 A1* | 5/2019 | Gil | B64F 1/02 |
| 2019/0193856 A1* | 6/2019 | Prager | G05D 1/0094 |

* cited by examiner

*Primary Examiner* — Brian M O'Hara
*Assistant Examiner* — Keith L Dixon

(57) ABSTRACT

A transport drone includes: a drone body; a transport unit for carrying an object to be transported; a balancing unit comprising a balancing frame and a swinging device, wherein the balancing frame is connected to the transport unit; the swinging device is respectively connected to the balancing frame and the drone body; the swinging device has rotational freedom; a sensor placed on the balancing frame for detecting a tilt angle of the balancing frame; and a controller electrically connected to both the sensor and the swinging device, wherein the controller controls rotation of the swinging device according to the tilt angle detected by the sensor, so as to adjust the tilt angle of the balancing frame and keep the transport unit in a horizontal state. The transport drone ensures that the items to be transported are in a horizontal state, effectively preventing dumping or damage of the items.

15 Claims, 2 Drawing Sheets

TRANSPORT DRONE

CROSS REFERENCE OF RELATED APPLICATION

The present invention claims priority under 35 U.S.C. 119(a-d) to CN 201720782341.8, filed Jun. 30, 2017.

BACKGROUND OF THE PRESENT INVENTION

Field of Invention

The present invention relates to a technical field of unmanned aerial vehicle, and more particularly to a transport drone.

Description of Related Arts

Transport drone is an unmanned low-altitude aircraft mainly operated by radio remote control equipment and self-contained control program, which is used to carry goods and can automatically deliver goods to their destinations. The transportation efficiency is high and labor costs can be reduced. Therefore, the application is very extensive.

However, during goods transport of a conventional transport drone, Smooth operations of the transport drone cannot be guaranteed due to uncertainties such as the weather and the surrounding environment. When encountering strong wind or avoiding obstacles, the transport drone is prone to tilt. At this time, there is no guarantee that the items to be transported on the transport drone will be in a horizontal state, causing the items to be dumped. If the articles to be transported is fragile, the articles are likely to collide with each other and be damaged when the transport drone is tilted.

Therefore, an improved transport drone is urgently needed.

SUMMARY OF THE PRESENT INVENTION

An object of the present invention is to provide a transport drone which ensures that the items to be transported are in a horizontal state, effectively preventing dumping or damage of the items to be transported.

Accordingly, in order to accomplish the above object, the present invention provides a transport drone, comprising: a drone body; a transport unit for carrying an object to be transported; a balancing unit comprising a balancing frame and a swinging device, wherein the balancing frame is connected to the transport unit; the swinging device is respectively connected to the balancing frame and the drone body; the swinging device has rotational freedom; a sensor placed on the balancing frame for detecting a tilt angle of the balancing frame; and a controller electrically connected to both the sensor and the swinging device, wherein the controller controls rotation of the swinging device according to the tilt angle detected by the sensor, so as to adjust the tilt angle of the balancing frame and keep the transport unit in a horizontal state.

Preferably, the swinging device comprises at least two swinging units, and each of the swinging units has one rotational freedom; the swinging units are vertically arranged and connected in sequence between the drone body and the balancing frame, rotational axes of the swinging units are skew lines; wherein two end swinging units are respectively connected to the balancing frame and the drone body.

Preferably, the swinging device consists of two the swinging units, and the rotational axis of the swinging units are the skew lines and vertical to each other.

Preferably, each of the swinging units comprises a swinging frame, a driving motor and a swinging shaft; wherein the driving motor and the swinging shaft are both installed on the swinging frame; an output shaft of the driving motor is connected to the swinging shaft for driving the swinging shaft to rotate relative to the swinging frame; wherein a swinging shaft of a swinging unit arranged at the balancing frame is fixed with the balancing frame, and a swinging frame of a swinging unit arranged at the drone body is fixed with the drone body; the driving motor of each of the swinging units is electrically connected to the controller.

Preferably, the drone body comprises an upper end face and a lower end face which are opposed; the balancing unit and the transport unit are placed on the upper end face of the drone body in sequence; the transport unit has a plate-like structure, which has an installing bottom and a containing groove above the installing bottom; the installing bottom is fixed with the balancing frame.

Preferably, a sealing cover is placed above the containing groove, which is magnetically attached onto an external wall of the transport unit.

Preferably, an elastic floor is placed in the containing groove for fitting the object to be transported with different sizes.

Preferably, the elastic floor comprises an elastic unit and a supporting board; two ends of the elastic unit are respectively connected to an internal wall of the containing groove and the supporting board.

Preferably, a limiting board is placed at a side of the sealing cover facing the containing groove, so as to limit horizontal movement of the object to be transported.

Preferably, an overflow hole is drilled on the transport unit; the overflow hole passes through the installing bottom and communicates with the containing groove; the transport unit has a receiving groove corresponding to the overflow hole; the receiving groove seals the overflow hole and is detachably connected to the installing bottom.

The transport drone of the present invention comprises the drone body and the transport unit. The balancing unit is arranged between the transport unit the drone body. The transport unit comprises the transport frame with the sensor, and the swinging device with rotational freedom. The sensor and the swinging device are both electrically connected to the control. When the transport drone is tilted, the sensor on the balancing frame detects the tilt angle of the balancing frame, namely detecting a tilt angle of the transport unit. The sensor rapidly feedbacks the tilt angle to the control, then the control rotates the swinging device for adjusting the tilt angle of the balancing frame, so as to keep the transport unit at the horizontal state and effectively prevent dumping or damage of the object to be transported.

These and other objectives, features, and advantages of the present invention will become apparent from the following detailed description, the accompanying drawings, and the appended claims.

ELEMENT REFERENCE

Figure 1:
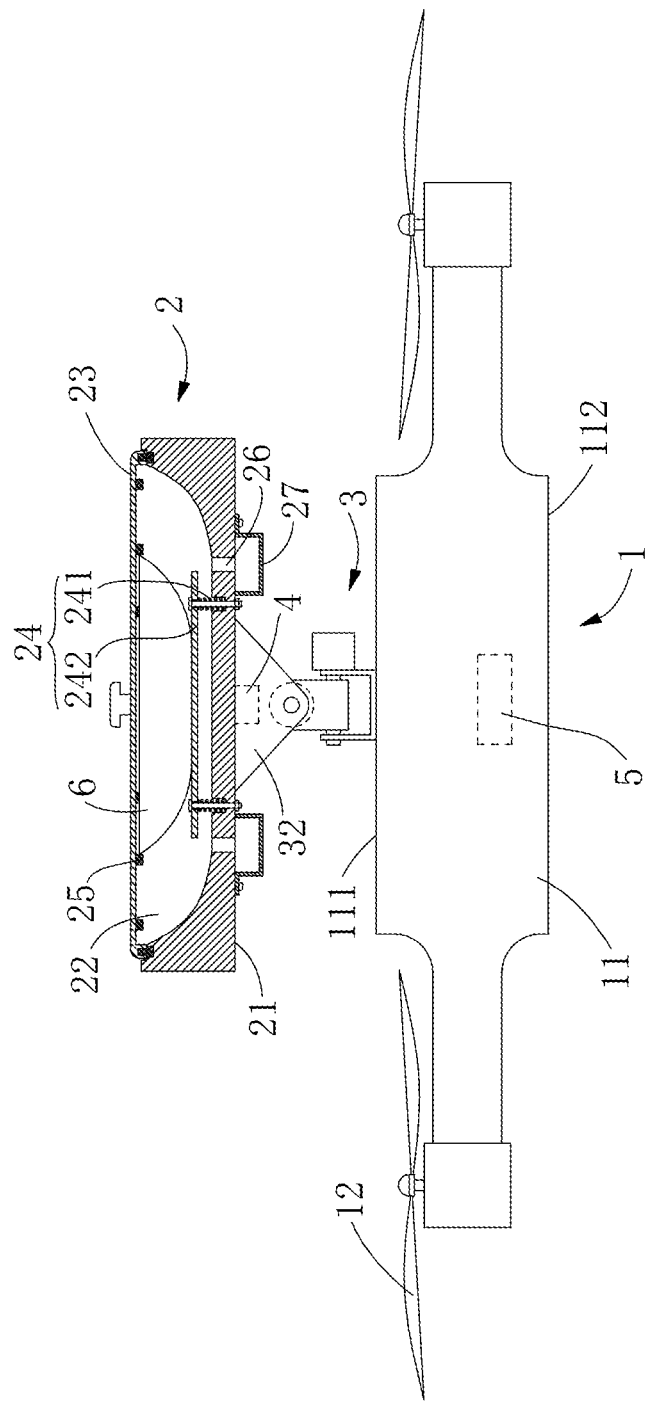
FIG. 1 is a structural view of a transport drone according to an embodiment 1 of the present invention.

1—drone body; 11—fuselage; 111—upper end face; 112—lower end face; 12—rotor unit;
2—transport unit; 21—installing bottom; 22—containing groove; 23—sealing cover; 24—elastic floor; 241—elastic unit; 242—supporting board; 25—limiting board; 26—overflow hole; 27—receiving groove;
3—balancing unit; 31—swinging device; 311—swinging frame; 311a—connecting board; 311b—upper supporter; 311c—lower supporter; 312—driving motor; 313—swinging shaft; 32—balancing frame;
4—sensor;
5—controller;
6—object to be transported.

In the drawings, the same components use the same reference numerals. The drawings are not drawn with actual scale.

DETAILED DESCRIPTION OF THE PREFERRED EMBODIMENT

The features and exemplary embodiments of various aspects of the present invention will be described in detail below. In the following detailed description, numerous specific details are set forth in order to provide a thorough understanding of the present invention. However, it will be apparent to those skilled in the art that the present invention may be practiced without some of these specific details. The following description of the embodiments is merely intended to provide a better understanding of the present invention by illustrating examples of the present invention. In the drawings and the following description, at least some of the well-known structures and techniques are not shown, so as to avoid unnecessarily obscuring the present invention. Furthermore, for clarity, the dimensions of the partial structures may be exaggerated. Additionally, the features, structures, or characteristics described hereinafter may be combined in any suitable manner in one or more embodiments.

The position words appearing in the following description are all directions shown in the drawings, and do not limit the specific structure of the transport drone according to the present invention. In the description of the present invention, it should be further noted that, unless otherwise specified and limited, the terms "install" and "connect" should be understood in a broad sense. For example, it may be a fixed connection or a detachable connection, or integrally connected, either directly or indirectly. Those of ordinary skill in the art can understand the specific meanings of the above terms in the present invention.

The transport drone provided by the embodiments of the present invention can carry articles. The following embodiments of the present invention describe application of the transport drone in the catering industry and serving the restaurant as an example. However, the application of the transport drone of the present invention is not limited to the following embodiments. The present invention can also be used in other fields and such scope of the present invention should also be protected.

Figure 2:
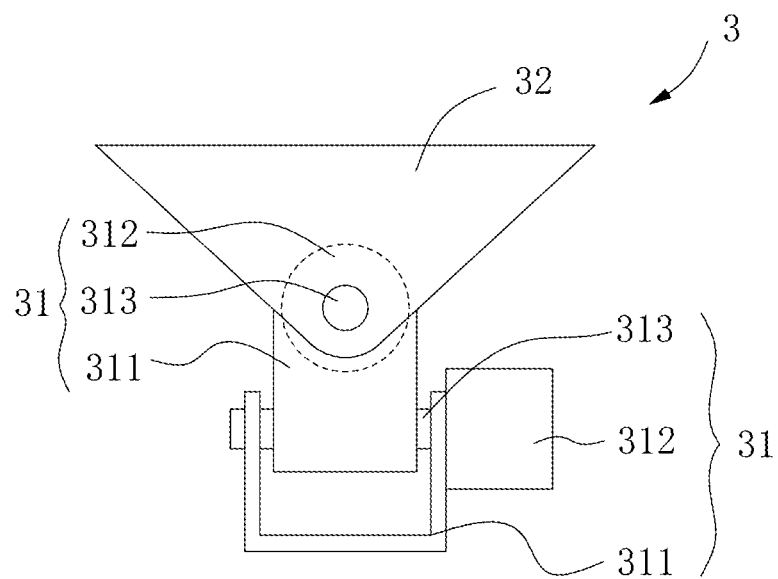
FIG. 2 is a structural view of a balancing unit according to the embodiment 1 of the present invention.
Figure 3:
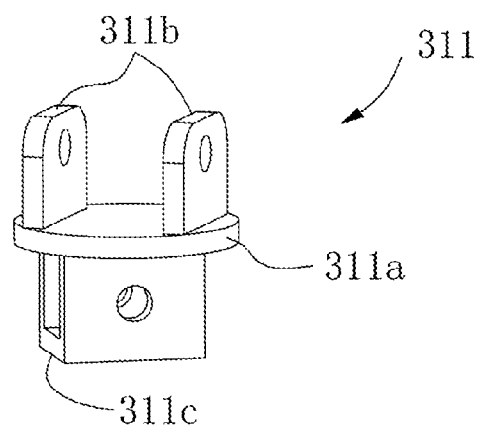
FIG. 3 is a structural view of a swinging frame according to an embodiment 2 of the present invention.

Referring to FIGS. 1-3 of the drawings, a transport drone according to embodiments of the present invention is illustrated.

Referring to FIGS. 1 and 2, an embodiment of the present invention provides a transport drone, comprising: a drone body 1; a transport unit 2, a balancing unit 3, a sensor 4 and a controller 5. The transport unit 2 is for carrying an object 6 to be transported. The balancing unit 3 comprises a balancing frame 32 and a swinging device, wherein the balancing frame 32 is connected to the transport unit 2. The swinging device is respectively connected to the balancing frame 32 and the drone body 1; the swinging device has rotational freedom. Specifically, the swinging device preferably comprises at least two swinging units 31, and each of the swinging units 31 has one rotational freedom; the swinging units 31 are vertically arranged and connected in sequence between the drone body 1 and the balancing frame 32, and rotational axes of the swinging units 31 are skew lines; wherein two end swinging units 31 are respectively connected to the balancing frame 32 and the drone body 1. The sensor 4 is placed on the balancing frame 32 for detecting a tilt angle of the balancing frame 32. Preferably, the controller 5 is electrically connected to both the sensor 4 and the swinging device, wherein the controller controls rotation of the swinging units 31 according to the tilt angle detected by the sensor 4, so as to adjust the tilt angle of the balancing frame 32 and keep the transport unit 2 in a horizontal state.

When the transport drone according to the embodiment of the present invention is tilted, the sensor 4 on the balancing frame 32 detects the tilt angle of the balancing frame 32, namely detecting a tilt angle of the transport unit 2. The sensor 4 rapidly feedbacks the tilt angle to the control 5, then the control 5 rotates the swinging units 31 for adjusting the tilt angle of the balancing frame 32, so as to keep the transport unit 2 at the horizontal state and effectively prevent dumping or damage of the object 6 to be transported.

Specifically, the drone body 1 of the embodiment may be a conventional drone, comprising a fuselage 11 and a plurality of rotor units 12; wherein the rotor units 12 are evenly distributed around the fuselage 11; the fuselage 11 comprises opposed upper end face 111 and lower end face 112, which means the drone comprises the opposed upper end face 111 and lower end face 112; the balancing unit 3 and the transport unit 2 are set on the upper end face 111 of the fuselage 11 in sequence.

The swinging device consists of two the swinging units 31, wherein the swinging device has two rotational freedoms, and the swinging units 31 have a same structure. Each of the swinging units 31 comprises a swinging frame 311, a driving motor 312 and a swinging shaft 313. According to the embodiment, a cross section of the swinging frame 311 is U-shaped by bending a sheet material. The driving motor 312 and the swinging shaft 313 are both installed on the swinging frame 311. Specifically, the swinging shaft 313 is placed in a U-shaped groove of the swinging frame 311 and rotatably installed on two vertical boards of the swinging frame 311 with both ends vertically arranged; the driving motor 312 is fixed on one of the vertical boards of the swinging frame 311, and an output shaft of the driving motor 312 is connected to the swinging shaft 313 for driving the swinging shaft 313 to rotate relative to the swinging frame 311, which means the swinging unit 31 has a rotational freedom. According to the embodiment, the two swinging units 31 are vertically arranged and connected between the fuselage 11 and the balancing frame 32 in sequence, and the rotational axis of the swinging units 31 are the skew lines and vertical to each other. A swinging shaft 313 of a swinging unit 31 arranged at the balancing frame 32 is fixed with the balancing frame 32, and a swinging frame 311 of a swinging unit 31 arranged at the drone body 1 is fixed with the drone body 1. A swinging frame 311 of the swinging unit 31 arranged at the balancing frame 32 is fixed with a swinging shaft 313 of the swinging unit 31 arranged at the drone body 1. The balancing frame 32 has a block structure, whose cross section is a reversed triangle; the driving motor 312 of each of the swinging units 31 is electrically connected to the controller 5.

It should be understood that the swinging device preferably, but is not limited to, comprises two the swinging units 31. In other embodiments, a number of the swinging units 31 may also be larger, such as three, four or even more. More than two swinging units 31 are arranged and connected in a vertical direction between the drone body 1 and the balancing frame 32 in sequence, and rotational axes of the swinging units 31 are the skew lines. Preferably, rotation angles of the rotational axes of adjacent swinging units 31 are the same. As a result, the swinging frame 311 is not limited to a U shape. For example, when the number of the swinging units 31 is three, a structure of the swinging frame 311 may specifically be a form as shown in FIG. 3, comprising a connecting board 311a, an upper supporter 311b and a lower supporter 311c, wherein connecting holes are drilled at the upper supporter 311b and the lower supporter 311c. An intersecting angle of the connecting holes of the upper supporter 311b and the lower supporter 311c is preferably 120°. In practice, both ends of the rotating shaft 313 are installed in the connecting hole of the upper supporter 311b. The driving motor 312 is mounted on the upper supporter 311b and a driving shaft of the driving motor 312 is connected to the swinging shaft 313. Of the three swinging units 31, a lower supporter 311c of a swinging frame 311 of a swinging unit 31 at middle is connected to the swinging shaft 313 of the swinging unit 31 at the drone body 1. The swinging shaft 313 of the swinging unit 31 at the middle is connected to a lower supporter 311c of a swinging frame 311 of a swinging unit 31 at the balancing frame 32. It can be understood that the structure of the swinging frame 311 can be changed correspondingly with increase of the number of the swinging units 31, as long as it is ensured that the swinging units 31 can be reliably connected according to a predetermined intersection angle, and the swinging units 31 at opposite ends are reliably connected to the drone body 1 and the balancing frame 32 with corresponding rotational freedom.

The swinging device comprises more than two swinging units 31, wherein the sensor 4 detects the tilt angle of the balancing frame 32 and feedbacks the tilt angle to the control 5, then the control 5 rotates the driving motor 312 of the swinging units 31 at corresponding positions for adjusting the tilt angle of the balancing frame 32, so as to keep the transport unit 2 at the horizontal state.

Of course, the swinging device may comprise only one swinging unit 31, wherein the swinging device has the rotational freedom. According to the embodiment, the swinging unit 31 preferably adopts a structure as shown in FIG. 2. In practice, the swinging frame 311 of the swinging unit 31 is fixed with the drone body 1, and the swinging shaft 313 of the swinging unit 31 is fixed with the balancing frame 32. According to the embodiment, the swinging device comprises only one swinging unit 31 for adjusting the tilt angle of the balancing frame 32 along a swinging direction of the singing unit 31, namely keeping the transport unit 2 in the horizontal state in a certain range.

It should be understood that when the swinging device comprises only one swinging unit 31, the swinging unit 31 is not limited to above structure adjusting, and other structure adjusting may be adopted, such as a universal wheel, which has more than two rotational freedoms for more sufficiently keeping the transport unit 2 at the horizontal state.

The transport unit 2 has a plate-like structure, such as a circular plate structure and a polygon plate structure, which has an installing bottom 21 and a containing groove 22 above the installing bottom 21; the installing bottom 21 is fixed with the balancing frame 32, and the object 6 to be transported (i.e. a service plate) can be placed in the containing groove 22.

According to an alternative embodiment, a sealing cover 23 is placed above the containing groove 22. A shape of the sealing cover 23 matches a shape of the containing groove 22. Magnets are continuously or discontinuously arranged at a periphery of the containing groove 22 of the transport unit 2 (i.e. an external wall of the transport unit 2). Preferably, the magnets are embedded in the transport unit 2, wherein magnets are embedded in the sealing cover 23 for attaching the magnets of the transport unit 2, in such a manner that the sealing cover 23 is magnetically attached onto the external wall of the transport unit 2. With the sealing cover 23, the object 6 to be transported in the containing slot 22 is safer. In a sudden situation, it is possible to effectively prevent the object 6 to be transported, which is caused by inertial action, from falling out of the containing groove 22.

Preferably, an elastic floor 24 is placed in the containing groove 22 for fitting the object 6 to be transported with different sizes. In practice, the object 6 to be transported is placed on the elastic floor 24, and an upward elastic force is applied to the object 6 to be transported through the elastic floor 24, so that the object 6 to be transported is clamped between the elastic floor 24 and the sealing cover 23, wherein the object 6 to be transported with different heights and sizes of can be hold to be stable. According to the embodiment, the elastic floor 24 comprises an elastic unit 241 and a supporting board 242; two ends of the elastic unit 241 are respectively connected to an internal wall of the containing groove 22 and the supporting board 242. The elastic unit 241 is preferably a compression spring. In order to ensure stability of the elastic floor 24 and avoid shaking, in alternative embodiments, a plurality of guide pillars are connected between the supporting board 242 and the inner wall of the containing groove 22, and the elastic unit 241 consists of the compression springs whose quantity equals to quantity of the guide pillars. Each of the guide pillars is sleeved with one of the compression springs, and two ends of the guide pillar are provided with limiting members, so that the supporting board 242 can slide along the guide pillars while the supporting board 242 will not fall out from the guide pillars. As a result, stability of the elastic floor 24 is ensured.

It can be understood that the elastic floor 24 is not limited to the above-mentioned form. In some embodiments, the elastic floor 24 may be an elastic airbag or an elastic rubber pad.

According to an alternative embodiment, three loops of limiting boards 25 are placed at a side of the sealing cover 23 facing the containing groove 22, so as to limit horizontal movement of the object 6 to be transported. In the embodiment, each loop of the limiting boards 25 has a continuous loop structure. Center lines of the limiting boards 25 are perpendicular to a plate surface of the sealing cover 23. When the object 6 to be transported (such as dinner plates, beverage cups, etc.) is held between the elastic floor 24 and the sealing cover 23, the corresponding limiting boards 25 have a certain limit on an outer circumference of the object 6 to be transported, so as to prevent horizontal movement of the object 6 to be transported, i.e. avoiding falling out from the supporting board 242 of the elastic floor 24, which further ensures the stability of the object 6 to be transported.

It can be understood that the number of the limiting boards 25 on the sealing cover 23 is not limited to three. In some optional embodiments, the number of the limiting boards 25 may also be one, two, or even more. Heights of the limiting boards 25 may be the same or different according to actual needs. Meanwhile, the structure of each loop of the limiting boards 25 is not limited to the continuous loop structure. In some embodiments, the structure of the limiting boards 25 may be formed by a plurality of arc plates along a circumference. Specifically, when the number of the limiting boards 25 is more than two loops, the two types of limiting boards 25 can be used in combination.

The transport drone provided by the embodiment of the present invention can be applied to catering industry, and the object 6 to be transported 6 is mainly dishes, drinks, etc. During picking and placing, dumping is likely. Therefore, in some optional embodiments, an overflow hole 26 is drilled on the transport unit 2. In the embodiment, there are two overflow holes 26 symmetrically distributed on the transport unit 2. The overflow hole 26 passes through the installing bottom 21 and communicates with the containing groove 22; the transport unit 2 has a receiving groove 27 corresponding to the overflow hole 26; the receiving groove 27 seals the overflow hole 26 and is detachably connected to the installing bottom 21 through bolts. When the object 6 to be transported is poured, the poured liquid can flow into the receiving hole 27 through the overflow hole 26 to avoid contamination of the object 6 to be transported in the containing groove 22. When the liquid in the receiving hole 27 reaches a certain amount, it can be removed from the installing bottom 21. After the liquid is poured out, the receiving hole 27 is reconnected to the corresponding position of the installing bottom 21.

It can be understood that the number of overflow holes 26 is not limited to two, and may be one, three or even more. Correspondingly, the number of the receiving slots 27 varies with the number of overflow holes 26.

The transport drone according to the embodiment of the present invention is mainly used in the catering industry, for the transport of dishes, drinks, etc. The object 6 to be transported is placed in the transport unit 2, and then the drone body 1 is started. The drone body 1 is used to transport the object 6 to a designated position. Since the driving motor 312 of the swinging unit 31 has a self-locking function, when the driving motor 312 is not operating, positions of the drone body 1, the balancing unit 3 and the transport unit 2 are relatively fixed. In a course of transportation, if an unexpected situation causes the drone body 1 to be unable to operate smoothly, or causes tilting of the drone body 1, the sensor 4 can quickly detect the tilt angle of the balancing frame 32. Because the transport unit 2 and the balancing frame 32 is fixedly connected, namely the sensor 4 can detect the tilt angle of the balancing frame 32, the sensor 4 feeds back the detected tilt angle to the controller 5, and the controller 5 controls forward and reverse rotation or a corresponding rotation angle of the driving motor 312 of the corresponding swinging unit 31, so as to adjust the tilt angle of the balancing frame 32, which ensures that the transport unit 2 is in the horizontal state, and the object 6 to be transported on the transport unit 2 is prevented from being dumped. At the same time, a sealing cover 23 is disposed above the containing groove 22, the elastic floor 24 is disposed inside the containing groove 22 and the limiting board 25 is disposed on the sealing cover 23, which all play a certain limit role for the object 6 to be transported, so as to further guarantee the stability of the object 6 to be transported.

The transport unit 2 according the above embodiments has the plate-like structure, and is preferably applied in the catering industry for serving in restaurants, etc. This is a preferred embodiment, but the structure of the transport unit 2 is not limited to the above forms. In an optional embodiment, the transport unit 2 may be a gripper robot. Specifically, for convenient adjustment, the balancing unit 3 and the transport unit 2 are preferably disposed on the lower end surface of the drone body 1 is sequence.

The transport unit 2 can be used for transporting parcels and the like by the gripper robot. When encountering strong wind or avoiding obstacles, even if the drone body 1 is tilted, it is possible to avoid dumping of the materials to be transported or collision damage of fragile goods between each other. As a result, the stability of the package to be transported is kept, and the application scope is more extensive.

One skilled in the art will understand that the embodiment of the present invention as shown in the drawings and described above is exemplary only and not intended to be limiting. It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A transport drone, comprising:
   a drone body, which comprises an upper end face and a lower end face which are opposed;
   a transport unit for carrying an object to be transported;
   a balancing unit comprising a balancing frame and a swinging device, wherein the balancing frame is connected to the transport unit; the balancing unit and the transport unit are placed on the upper end face of the drone body in sequence; the transport unit has a plate-like structure, which has an installing bottom and a containing groove above the installing bottom; the installing bottom is fixed with the balancing frame; the swinging device is respectively connected to the balancing frame and the drone body; the swinging device has rotational freedom;
   a sensor placed on the balancing frame for detecting a tilt angle of the balancing frame; and
   a controller electrically connected to both the sensor and the swinging device, wherein the controller controls rotation of the swinging device according to the tilt angle detected by the sensor, so as to adjust the tilt angle of the balancing frame and keep the transport unit in a horizontal state.

2. The transport drone, as recited in claim 1, wherein the swinging device comprises at least two swinging units, and each of the swinging units has one rotational freedom; the swinging units are vertically arranged and connected in sequence between the drone body and the balancing frame, rotational axes of the swinging units are skew lines; wherein two end swinging units are respectively connected to the balancing frame and the drone body.

3. The transport drone, as recited in claim 2, wherein the swinging device consists of two the swinging units, and the rotational axis of the swinging units are the skew lines and vertical to each other.

4. The transport drone, as recited in claim 2, wherein each of the swinging units comprises a swinging frame, a driving motor and a swinging shaft; wherein the driving motor and the swinging shaft are both installed on the swinging frame; an output shaft of the driving motor is connected to the swinging shaft for driving the swinging shaft to rotate relative to the swinging frame; wherein a swinging shaft of a swinging unit arranged at the balancing frame is fixed with the balancing frame, and a swinging frame of a swinging unit arranged at the drone body is fixed with the drone body; the driving motor of each of the swinging units is electrically connected to the controller.

5. The transport drone, as recited in claim 3, wherein each of the swinging units comprises a swinging frame, a driving motor and a swinging shaft; wherein the driving motor has a self-locking function, the driving motor and the swinging shaft are both installed on the swinging frame; an output shaft of the driving motor is connected to the swinging shaft for driving the swinging shaft to rotate relative to the swinging frame; wherein a swinging shaft of a swinging unit arranged at the balancing frame is fixed with the balancing frame, and a swinging frame of a swinging unit arranged at the drone body is fixed with the drone body; the driving motor of each of the swinging units is electrically connected to the controller.

6. The transport drone, as recited in claim 4, wherein a sealing cover is placed above the containing groove, which is magnetically attached onto an external wall of the transport unit.

7. The transport drone, as recited in claim 5, wherein a sealing cover is placed above the containing groove, which is magnetically attached onto an external wall of the transport unit.

8. The transport drone, as recited in claim 6, wherein an elastic floor is placed in the containing groove for fitting the object to be transported with different sizes; an upward elastic force is applied to the object to be transported through the elastic floor, so that the object to be transported is clamped between the elastic floor and the sealing cover.

9. The transport drone, as recited in claim 7, wherein an elastic floor is placed in the containing groove for fitting the object to be transported with different sizes; an upward elastic force is applied to the object to be transported through the elastic floor, so that the object to be transported is clamped between the elastic floor and the sealing cover.

10. The transport drone, as recited in claim 8, wherein the elastic floor comprises an elastic unit and a supporting board; two ends of the elastic unit are respectively connected to an internal wall of the containing groove and the supporting board.

11. The transport drone, as recited in claim 9, wherein the elastic floor comprises an elastic unit and a supporting board; two ends of the elastic unit are respectively connected to an internal wall of the containing groove and the supporting board.

12. The transport drone, as recited in claim 8, wherein a limiting board is placed at a side of the sealing cover facing the containing groove, so as to limit horizontal movement of the object to be transported.

13. The transport drone, as recited in claim 9, wherein a limiting board is placed at a side of the sealing cover facing the containing groove, so as to limit horizontal movement of the object to be transported.

14. The transport drone, as recited in claim 6, wherein an overflow hole is drilled on the transport unit; the overflow hole passes through the installing bottom and communicates with the containing groove; the transport unit has a receiving groove corresponding to the overflow hole; the receiving groove seals the overflow hole and is detachably connected to the installing bottom.

15. The transport drone, as recited in claim 7, wherein an overflow hole is drilled on the transport unit; the overflow hole passes through the installing bottom and communicates with the containing groove; the transport unit has a receiving groove corresponding to the overflow hole; the receiving groove seals the overflow hole and is detachably connected to the installing bottom.

\* \* \* \* \*